(12) United States Patent
Cheung

(10) Patent No.: US 6,715,716 B1
(45) Date of Patent: Apr. 6, 2004

(54) ECONOMY AIRCRAFT SLEEPER SEAT

(75) Inventor: Kwun-Wing W. Cheung, Shoreline, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/245,235

(22) Filed: Sep. 17, 2002

(51) Int. Cl.⁷ ................................................. B64D 11/06
(52) U.S. Cl. ...................... 244/118.6; 105/316; 297/65; 244/122 R
(58) Field of Search ............. 297/64–66, 188.04, 297/188.08, 188.11, 63, 232, 234, 236, 364, 353; 244/122 R, 118.5, 118.6; 105/315, 316, 322

(56) References Cited

U.S. PATENT DOCUMENTS

| | | | |
|---|---|---|---|
| 991,307 A | * 5/1911 | Hodgson | 297/64 |
| 1,548,334 A | * 8/1925 | Sebell | 297/64 |
| 2,332,841 A | * 10/1943 | Burton et al. | 244/118.6 |
| 2,796,111 A | * 6/1957 | Janczyszyn | 297/64 |
| 3,052,499 A | * 9/1962 | Wood | 244/118.6 |
| 5,425,516 A | * 6/1995 | Daines | 244/118.6 |
| 5,740,989 A | * 4/1998 | Daines | 244/118.6 |

* cited by examiner

Primary Examiner—Galen L. Barefoot
(74) Attorney, Agent, or Firm—Ann K. Galbraith

(57) ABSTRACT

An aircraft seat assembly 10 is provided including a plurality of aircraft seat elements 12. The aircraft seat assembly 10 includes a first aircraft seat element 18, having a first seat portion 16 and a first back portion 18. The first back portion 18 includes a lower back portion 22 and an upper back portion 24. The lower back portion 22 is rotatable between a raised position 26, wherein the lower back portion 22 is tangential with the upper back portion 24 to form a contiguous back rest 29, and a lowered position 28, wherein the lower back portion 22 is tangential with the first seat portion 16 to form an extended horizontal sleeping platform 32.

20 Claims, 1 Drawing Sheet

ECONOMY AIRCRAFT SLEEPER SEAT

TECHNICAL FIELD

The present invention relates generally to an aircraft sleeper seat, and more particularly to an aircraft sleeper seat that is alternately operational as a standard aircraft seat.

BACKGROUND OF THE INVENTION

Aircraft interiors have often been influenced as much by economic factors as they have been by engineering concerns. Weight savings for individual components affect not only aircraft performance but profitability as well. In this light, considerable effort has been expended in attempts to limit aircraft weight and improve efficiency. Working in conjunction with weight and efficiency, passenger occupancy has also played a significant role in aircraft economic factors. Increased passenger occupancy capacities have been one approach toward increasing airline economic efficiency.

Increased passenger occupancy allows airlines to sell a greater number of individual tickets for a given flight. Profits are thereby increased, while the increase in flight overhead related to the additional passengers is only minimally impacted. Unfortunately, the increase in passenger occupancy has resulted in restrictive seating arrangements as perceived by many passengers. As the number of passengers and passenger seating has been increased within aircraft, the amount of individual space allocated to each passenger has been respectively diminished. Comfort adjustments such as seat reclining are often extremely limited and often ineffectual. Luxuries such as sleeper seating has been all-but extinguished from coach seating. Cost concerns have thereby directly impacted passenger comfort and convenience.

Although in many cases the impact on passenger comfort has been viewed as an acceptable cost of operation, the loss of customer satisfaction and the increase of passenger irritability and discomfort should not be ignored. Air travel can be inherently stressful many passengers. Often larger passengers find the reduced personal space on modern aircraft to further increase their stress and discomfort levels. On many flights, multiple seats are often not filled and remain empty. These unsold seats represent a loss of valuable space that could be utilized to increase customer comfort. In addition, these unsold seats represent lost revenue for the airline. It would represent a real value to the airlines if revenue could be derived from these unused seats. If such increased revenue could be combined with increased customer satisfaction and comfort, the airline could benefit doubly. It would therefore be highly desirable to have an airline seat that could function both as a traditional seat as well as a sleeper seat when used in conjunction with a neighboring seat. This would allow for additional comfort and possible revenue if the use of the sleeper seat could be marketed to passengers at an additional cost.

SUMMARY OF THE INVENTION

It is, therefore, an object of the present invention to provide an aircraft seat capable of providing traditional passenger seating in addition to alternately providing sleeper seating to adjoining passengers when not in use. It is a further object of the present invention to provide an aircraft seat that can provide potential revenue for airlines when not sold as a traditional seat by providing marketable value as an upgrade to adjoining passengers.

In accordance with the objects of the present invention, an aircraft seat assembly is provided. The aircraft seat assembly includes a first aircraft seat element, having a first seat portion and a first back portion. The first back portion includes a lower back portion and an upper back portion. The lower back portion is rotatable between a raised position, wherein the lower back portion is tangential with the upper back portion to form a contiguous back rest, and a lowered position, wherein the lower back portion is tangential with the first seat portion to form an extended horizontal sleeping platform.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
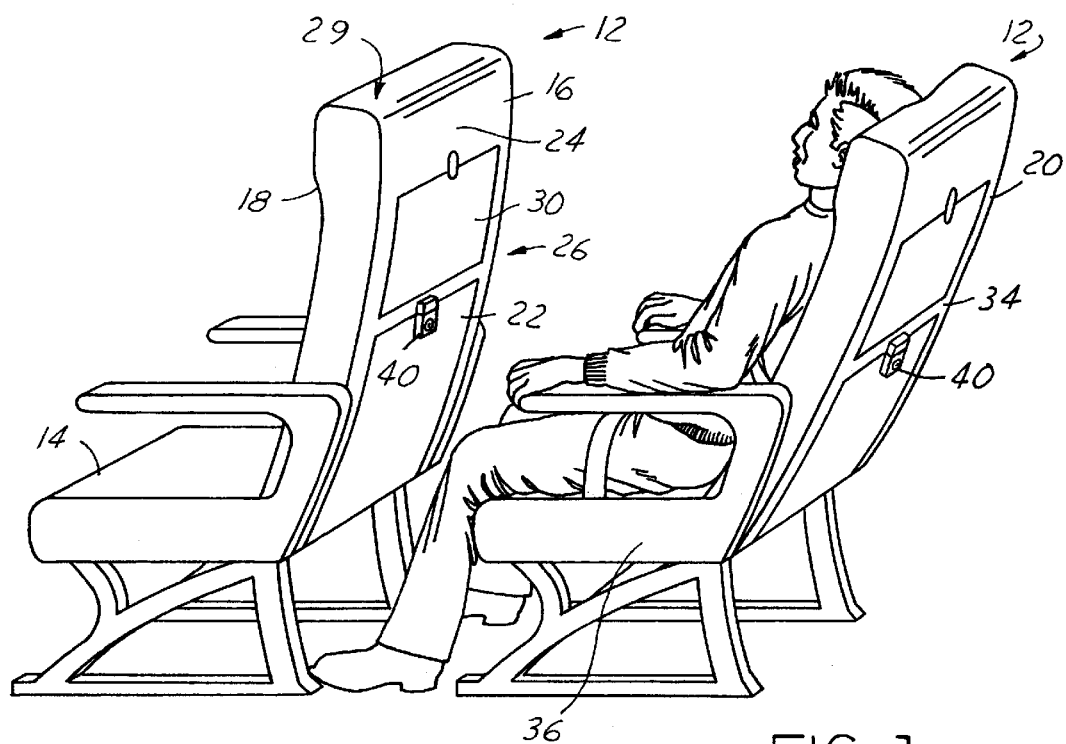
FIG. 1 is an illustration of an embodiment of an aircraft seat assembly in accordance with the present invention, the aircraft seat assembly illustrated in the primary seating configuration.

Referring now to FIG. 1, which is an illustration of an aircraft seat assembly 10 in accordance with the present invention. The aircraft seat assembly 10 includes a plurality of aircraft seat elements 12, each including a seat portion 14 and a back portion 16. It is contemplated that the aircraft seat assembly 10 maybe constructed with any number of aircraft seat elements 12 to suit a variety of layouts applicable to individual aircraft or airline designs. A first aircraft seating element 18 and a second aircraft seating element 20 are shown in FIG. 1 for illustrative purposes. It is further contemplated that the present invention is intended for use in combination with a wide variety of different size and shape aircraft seat elements.

Figure 2:
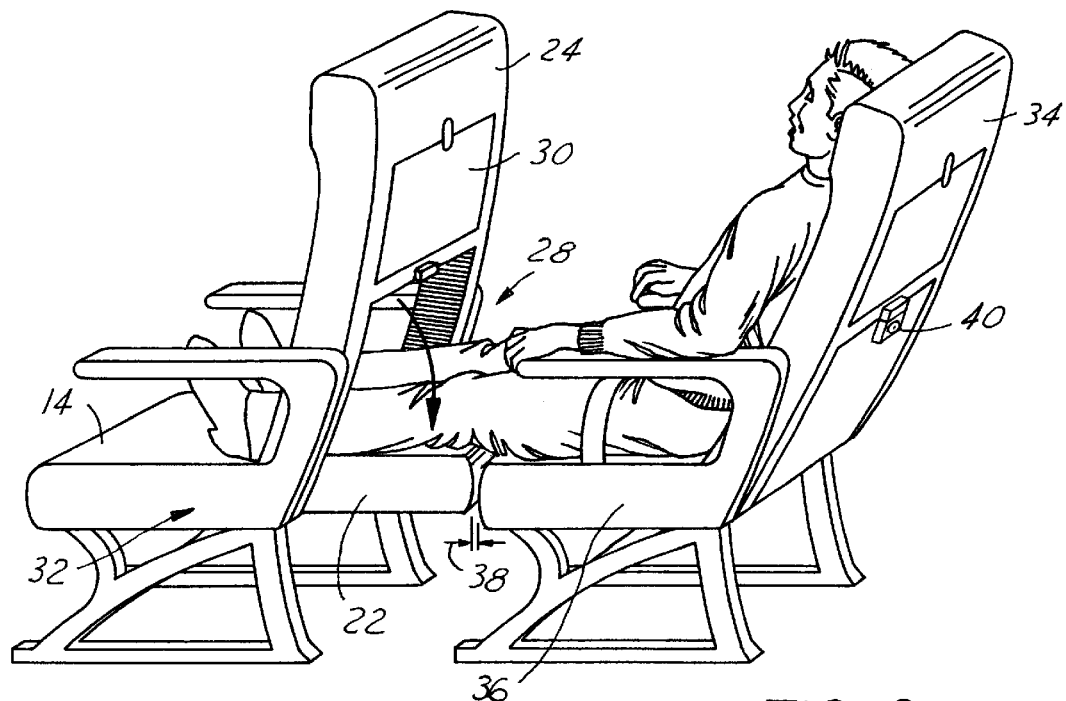
FIG. 2 is an illustration of the aircraft seat assembly illustrated in FIG. 1, the aircraft seat assembly illustrated in the optional sleeper configuration.

The present invention further includes a back portion 16 comprised of a lower back portion 22 and an upper back portion 24. The lower back portion 22 is rotatably movable between a raised position 26 and a lowered position 28 (see FIG. 2). In the raised position 26, the lower back portion 22 is positioned in a tangential arrangement with the upper back portion 24 to form a contiguous back rest 28. When in this arrangement, the contiguous back rest 29 preferably functions as any normal airline seat thereby allowing the aircraft seat assembly 10 to be marketed, sold, and utilized in a traditional fashion. It is contemplated that the contiguous back rest 29 can include any or all of the operations associated with traditional airline seating including, but not limited to, reclining functions and tray table 30 storage/mounting.

The present invention, however, adds improved value and function to the aircraft seat assembly 10 by having the lower back portion 22 rotatably movable to the lowered position 28. In the lowered position 28, the lower back portion 22 is positioned in a tangential arrangement with the seat portion 14 to form an extended horizontal sleeping platform 32. Although a single aircraft seat element 12 may utilize the present invention with some benefit, the placement of aircraft seats within most economy seating on aircraft can make such an individual use unpractical. It is therefore contemplated that the present invention can include a second aircraft seating element 20 positioned behind the first aircraft seating element 18. The second aircraft seating element 20 includes a second seating back portion 34 and a second seating seat portion 36. The lower back portion 22 is proportioned such that when it is in the lowered position 28 it is close proximity to, and tangentially orientated to, the second seating seat portion 36. In some embodiments, however, it is contemplated that an exit gap 38 may be located between the lower back portion 22 in the lowered position 28 and the second seat portion 36 to provide sufficient exit passage during emergencies. The use of the second seating seat portion 36 in either event allows the extended horizontal sleeping platform 32 to be increased in length and further improve is usefulness.

Although it is contemplated that the present invention may be utilized in a variety of fashions, one embodiment contemplates that the extended horizontal sleeping platform 32 be made available to a passenger 38 seated within the second aircraft seating element 20 when the first aircraft seating element 18 is unoccupied. In one concept, every aircraft seat element may include the aforementioned features. Other conceptions limit the placement of such improve aircraft seating assemblies 10 to use within outer seating of the aircraft to reduce passenger traffic concerns. Furthermore, it is contemplated that although these features may be made generally available to improve customer satisfaction, sales and placement of passengers within the aircraft compartment can be controlled such that the availability of use of the extended horizontal sleeping platform 32 may be marketed and sold as an upgrade to passengers 38 and thereby increase revenue for the airlines by deriving revenue from unsold seats.

In light of the last conceived usage, it is further contemplated that the back portion 16 may further include a locking element 40 securing the lower back portion 22 into the raised position 26. This locking element 40 can provide a dual purpose. It can be utilized to secure the lower back portion 22 to prevent unintended rotation into the lowered position 28. Additionally, however, it can be used to prevent unauthorized movement of the lower back portion 22 as well. In this scenario, an airline attendant may be required to unlock the locking element 40 in response to either a fee paid to the attendant during flight or in response to a pre-paid upgrade purchased prior to departure. Although a simple locking mechanism has been illustrated, a wide variety of securing mechanisms are contemplated by the present invention.

While particular embodiments of the invention have been shown and described, numerous variations and alternative embodiments will occur to those skilled in the art. Accordingly, it is intended that the invention be limited only in terms of the appended claims.

What is claimed is:

1. An aircraft seating assembly comprising:
   a first aircraft seat element including a first seat portion and a first back portion;
   a fixed upper back portion and a rotatable lower back portion forming said first back portion, said lower back portion rotatably movable between a raised position tangential with said upper back portion and a lowered position tangential with said seat portion; and
   an extended horizontal sleeping platform comprising said first aircraft seat element and said lower back portion rotated into said lowered position.

2. An aircraft seating assembly as described in claim 1 further comprising:
   a tray table mounted to said upper back portion.

3. An aircraft seating assembly as described in claim 1, further comprising:
   a locking element capable of securing said lower back portion in said raised position.

4. An aircraft seating assembly as described in claim 1, further comprising:
   a locking element securing said lower back portion in said raised position, said locking element only unlockable by airline personnel.

5. An aircraft seating assembly as described in claim 1, further comprising:
   a second aircraft seating element positioned rearward of said first aircraft seating element, said second aircraft seating element including a second seat portion and a second back portion, said second seat portion positioned tangential with said lower back portion when said lower back portion is in said lowered position.

6. An aircraft seating assembly as described in claim 5, further comprising:
   an exit gap positioned between said second seat portion and said lower back portion when said lower back portion is in said lowered position.

7. An aircraft seating assembly as described in claim 1, wherein said first seating element is positioned within an outer seating of an aircraft.

8. An aircraft seating assembly comprising:
   a first aircraft seat element including a first seat portion and a first back portion;
   a fixed upper back portion and a rotatable lower back portion forming said first back portion, said lower back portion rotatably movable between a raised position tangential with said upper back portion and a lowered position tangential with said seat portion;
   a second aircraft seating element positioned rearward of said first aircraft seating element, said second aircraft seating element including a second seat portion and a second back portion;
   an extended horizontal sleeping platform comprising said first aircraft seat element, said second seat portion, and said lower back portion rotated into said lowered position.

9. An aircraft seating assembly as described in claim 8 further comprising:
   a tray table mounted to said upper back portion.

10. An aircraft seating assembly as described in claim 8, further comprising:
    a locking element capable of securing said lower back portion in said raised position.

11. An aircraft seating assembly as described in claim 8, further comprising:
    a locking element securing said lower back portion in said raised position, said locking element only unlockable by airline personnel.

12. An aircraft seating assembly as described in claim 8, further comprising:
    an exit gap positioned between said second seat portion and said lower back portion when said lower back portion is in said lowered position.

13. A method of utilizing unoccupied aircraft seating comprising:

folding down a lower back portion of a first aircraft seating element until said lower back portion is tangential with a first seat portion;

utilizing said first seat portion, said lower back portion and a second seat portion, positioned rearward of said lower back portion, as an extended horizontal sleeping surface.

14. A method as described in claim 13, further comprising:

selling said extending sleeping surface to a passenger seated in a second seating element positioned rearward of said first aircraft seating element.

15. A method as described in claim 13, further comprising:

locking said lower back portion in a raised position tangential with an upper back portion to create a contiguous back rest when said first aircraft seating element is occupied.

16. A method as described in claim 14, wherein said extending sleeping surface is sold to said passenger by an airline attendant during flight.

17. A method as described in claim 14, wherein said extending sleeping surface is sold to said passenger as an upgrade option during airline ticket purchasing.

18. A method as described in claim 14, wherein said extending sleeping surface is sold to said passenger as an upgrade option during pre-flight checkin.

19. A method as described in claim 13, further comprising:

unlocking said lower back portion from a raised position tangential with an upper back portion in order to fold said lower back portion into said lowered position.

20. A method as described in claim 19, wherein said unlocking can only be performed by airline personnel.

* * * * *